US 6,704,801 B1

(12) United States Patent
Minyard (10) Patent No.: US 6,704,801 B1
(45) Date of Patent: Mar. 9, 2004

(54) ATOMIC TRANSMISSION OF MULTIPLE MESSAGES IN A VIRTUAL SYNCHRONY ENVIRONMENT

(75) Inventor: Trenton Corey Minyard, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/252,140

(22) Filed: Feb. 18, 1999

(51) Int. Cl.$^7$ .............................................. G06F 9/46
(52) U.S. Cl. ........................ 709/314; 709/400; 714/12
(58) Field of Search ................................ 709/314, 315, 709/200, 201, 319, 400, 1; 714/12

(56) References Cited

U.S. PATENT DOCUMENTS

| | | | | |
|---|---|---|---|---|
| 5,224,215 A | * | 6/1993 | Disbrow | 709/234 |
| 5,617,561 A | * | 4/1997 | Blaauw et al. | 703/26 |
| 5,887,168 A | * | 3/1999 | Bahls et al. | 709/314 |
| 5,916,307 A | * | 6/1999 | Piskiel et al. | 709/314 |
| 6,052,363 A | | 4/2000 | Koch | |
| 6,058,389 A | * | 5/2000 | Chandra et al. | 707/1 |
| 6,247,064 B1 | * | 6/2001 | Alferness et al. | 709/312 |

OTHER PUBLICATIONS

Liu et al. "An Atomic Model for Message–Passing" Dept. Of Computer Science, Yale University, 1993, pp. 1–10.*

Moser et al. "Extended Virtual Synchrony" Dept of Electrical and Computer Engineering, University of California, 1994, pp. 1–20.*

Sape Mullender, *Distributed Systems*, 2$^{nd}$, ACM Press, NY, NY, 1993, pp. 255, 329–352, 413–417.

David Powell. *Commuinications of the ACM*, NY, NY, Group Com, vol. 39, No. 4. Apr. 1996. pp. 50–53.

Moser, L.E., Milliar–Smith, Agarwal, Budhia and Lingley––Papadopoulous. *Totem: A Fault–Tolerant Multicast Group Communication System, Communications of the ACM*, NY, NY, vol. 39, No. 4. Apr. 1996. pp. 54–63.

Deborah A. Agarwal, "Totem: A Reliable Ordered Delivery Protocol for Interconnected Local–Area Networks" (dissertation submitted in partial satisfaction of the requirements of the Degree of Doctor of Philosophy in Electrical and Computer Engineering), University of California, Santa Barbara (Aug., 1994).

* cited by examiner

*Primary Examiner*—John Follansbee
*Assistant Examiner*—V. H. Nguyen
(74) *Attorney, Agent, or Firm*—Carr LLP (57) ABSTRACT

Multiple individual messages (210, 220, 230, 240) generated by a process in response to an event or incoming message are transmitted through a system (100) in a virtual synchrony environment by assembling the multiple individual messages into a single atomic message (200) and delivering the atomic message (200) to all or none of the destination addresses of each of the individual messages. A destination process does not respond to any of the individual messages until the entire atomic message (200) has been received. Individual messages not intended for a particular process may be removed by a computer or process at the destination.

40 Claims, 10 Drawing Sheets

ATOMIC TRANSMISSION OF MULTIPLE MESSAGES IN A VIRTUAL SYNCHRONY ENVIRONMENT

TECHNICAL FIELD

The invention relates generally to distributed communications systems and, more particularly, to a method providing for the atomic transmission of messages in a network within a virtual synchrony environment, to thereby enhance the fault tolerance of the system.

BACKGROUND

A distributed system utilizing a protocol referred to as virtual synchrony (i.e., operating in a virtual synchrony environment) comprises a plurality of process groups, each of which process groups comprises a plurality of processes. Processes are typically distributed among two or more computers so that if one computer fails, the entire process group does not fail. Processes and process groups are configured for managing and executing application programs, and for transmitting messages between the process groups and processes.

Virtual synchrony ensures that a message transmitted to a plurality of destination processes is received by either all or none of the destination processes. Virtual synchrony, furthermore, ensures that messages transmitted in a specific order from one process of the system are delivered to destination processes in the order in which they were initially transmitted. In a system using virtual synchrony, the message order is maintained even though subsequent messages destined for other processes are interspersed with each other. When such interspersed messages are received by the respective destination processes, virtual synchrony ensures that the original message order is maintained by the receiving processes.

A drawback with conventional virtual synchrony is that if a device in a distributed system fails (i.e., a "fault") during the transfer of a sequence of related messages resulting from a common event, a destination process is unable to determine that all such messages have not been delivered, and will thus not recover from such a fault. Such a fault may result in the propagation of further faults if the process receiving the message subsequently generates actions or messages which depend on conditions or states which may have resulted but for the fault. What is needed, therefore, is a system and method which would enable a distributed system to identify and recover from such faults.

SUMMARY

The present invention provides a method for ensuring that all or none of the messages generated by a process in response to an event or incoming message in a virtual synchrony environment are delivered to all of the destinations of every individual message. This is accomplished by assembling into an atomic message multiple individual messages generated by a process in response to an event. The atomic message is transmitted through a system in a virtual synchrony environment and all or none of the messages are delivered to all of the destination addresses of each of the individual messages. A destination process does not respond to any of the individual messages until the entire atomic message has been received. Individual messages not intended for a particular process may be removed by a computer or process at the destination.

By the use of the present invention, the occurrence of faults which result from the partial delivery of messages is minimized. As a consequence, if a failure occurs in the transmission of a message, the propagation of error is minimized. Thus, error recovery, as well as fault tolerance, is enhanced.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
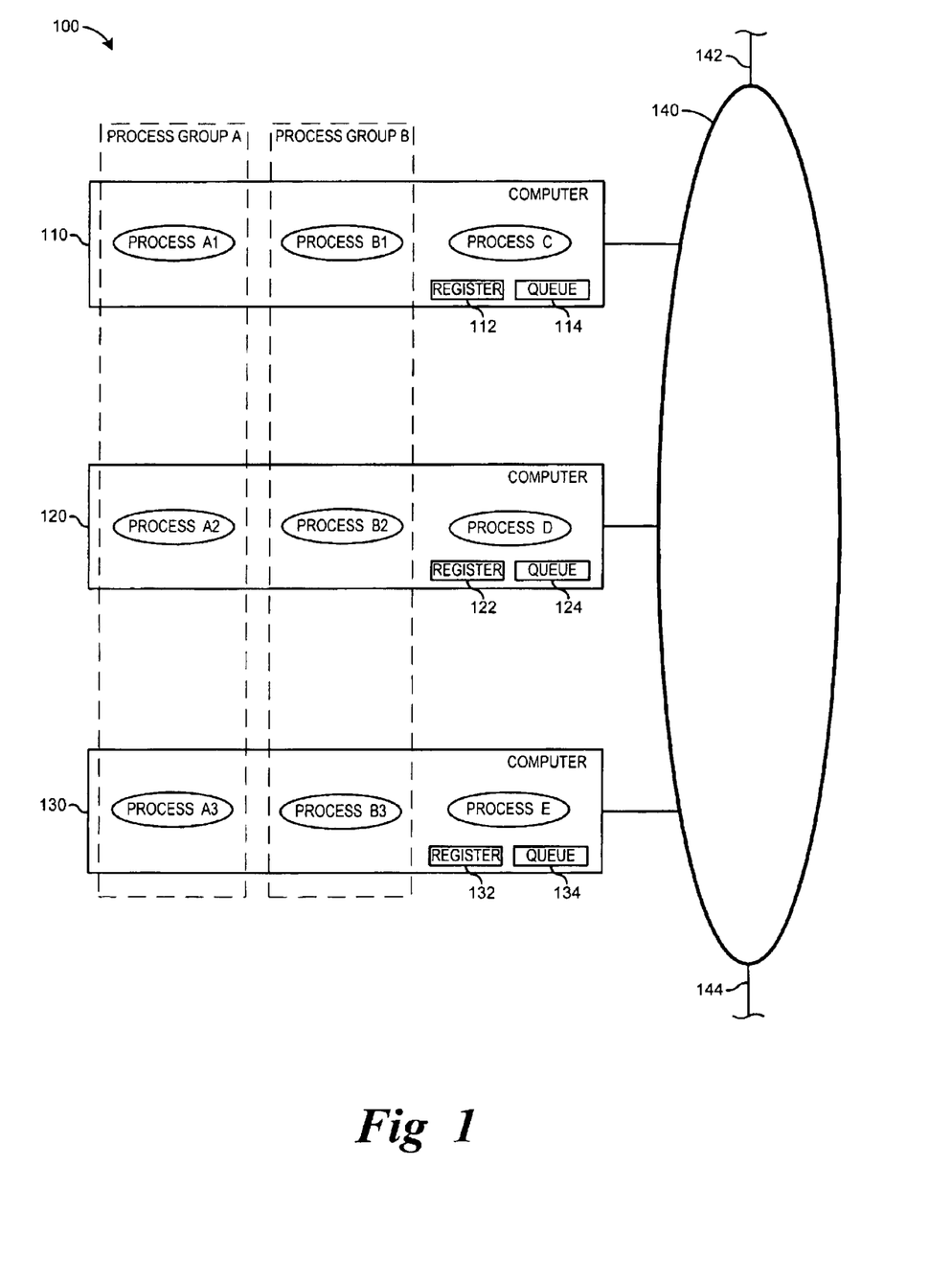
FIG. 1 is a representative high-level schematic diagram of a virtual synchrony system showing three interconnected computers with related processes.

Referring to FIG. 1 of the drawings, the reference numeral 100 generally designates a distributed virtual synchrony system, such as a Totem system, embodying features of the present invention. As shown in FIG. 1, the system 100 includes a first computer 110, a second computer 120, and a third computer 130, though the system may include a greater or lesser number of computers. The computers 110, 120, and 130 are interconnected for communication therebetween via a virtual synchrony network bus 140, such as a Totem ring. The bus 140 includes lines 142 and 144 which are effective to enable the bus 140 to be connected to additional buses, such as additional Totem rings, via a router or gateway (not shown).

As shown in FIG. 1 and described further below, each computer 110, 120, and 130 includes a plurality of registers 112, 122, and 132, respectively, for storing a register sequence number for messages transmitted and/or received from each of a corresponding plurality of sources. Each computer 110, 120, and 130 also includes a plurality of queues 114, 124, and 134, respectively, for temporarily storing messages transmitted and/or received from each of a corresponding plurality of sources. Furthermore, three processes reside within memory (not shown) on each computer 110, 120, and 130, though a greater or lesser number of processes may reside on each computer. Specifically, a Process A1, a Process B1, and a Process C reside on the first computer 110. A Process A2, a Process B2, and a Process D reside on the second computer 120. A Process A3, a Process B3, and a Process E reside on the third computer 130. As denoted in FIG. 1 in dashed outline across the computers 110, 120, and 130, the Processes A1, A2, and A3 together form a first Process Group A; and the processes B1, B2, and B3 together form a second Process Group B. The Processes C, D, and E each form process group comprising only a single process. It is understood that process groups may comprise any number of processes.

Each of the aforementioned computers 110, 120, and 130, and each of the processes A1, A2, A3, B1, B2, B3, C, D, and E, comprises a plurality of protocol layers (not shown) which are considered to be well-known and are effective for interfacing the respective processes with the system 100 and for managing the execution of application programs to respond to incoming events or messages (collectively referred to hereinafter as "events") in a manner well-known in the art. Furthermore, each of the processes A1, A2, and A3 of the Process Group A is effective for directing the execution of a particular application program and for providing fault tolerance through redundancy should one process within the Process Group A fail (e.g., when a computer may fail). Similarly, each of the processes B1, B2, and B3 of the Process Group B is effective for directing the execution of a particular application program and for providing fault tolerance through redundancy should one process within the Process Group B fail. The protocol layers within the processes typically ensure that a message sent to one process, such as the Process A1, is distributed to all other processes, such as the Processes A2 and A3, within the same process group, to thereby further ensure that, should one process within a process group fail before completing a transaction of events, any other process in the group may complete the transaction, thereby providing enhanced fault tolerance to the system 100. Such fault tolerance techniques for providing redundancy between processes within a process group is considered to be well-known in the art and will, therefore, not be discussed in further detail herein.

Figure 2:
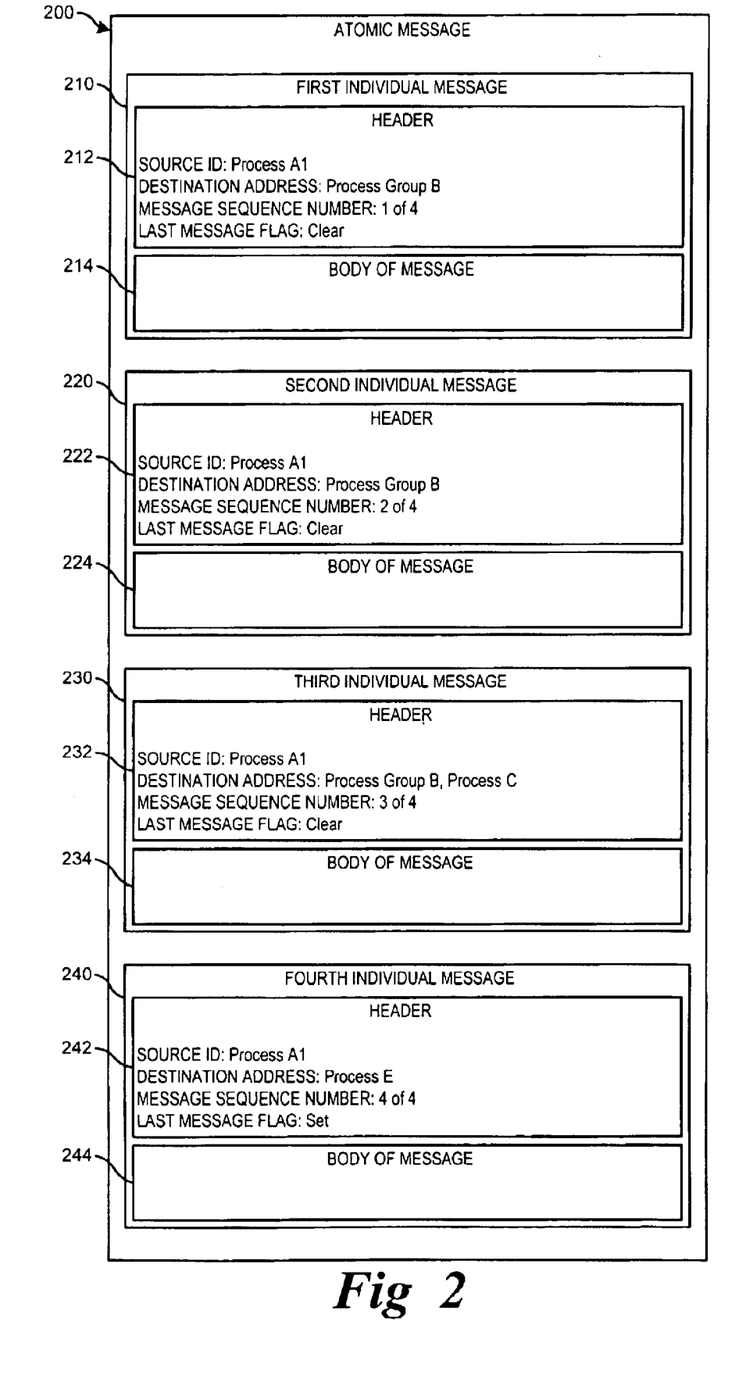
FIG. 2 is schematic diagram showing the assembly of an atomic message embodying features of the present invention.

FIG. 2 exemplifies an atomic message 200 used in accordance with the present invention, as discussed below. The atomic message 200 encapsulates a first individual message 210, a second individual message 220, a third individual message 230, and a fourth individual message 240 which messages would otherwise be individually transmitted through the system 100 using conventional methods. While the atomic message 200 is exemplified as encapsulating four messages, any number of individual messages may be encapsulated within the atomic message 200.

Each individual messages 210, 220, 230, and 240 within the atomic message 200 further comprises at least a header 212, 222, 232, and 242, respectively, and a body 214, 224, 234, and 244, respectively. In accordance with the present invention, each header 212, 222, 232, and 242 contains, at a minimum, a source ID identifying the process from which the message originated, a destination address identifying where the message is to be delivered, a message sequence number, and either or both a number representing the total number of messages encapsulated within the atomic message 200, and/or a last message flag which would be set only for the last message in a sequence of messages encapsulated within an atomic message. Each body 214, 224, 234, and 244 contains information carried within a respective message in a conventional manner.

Figure 3:
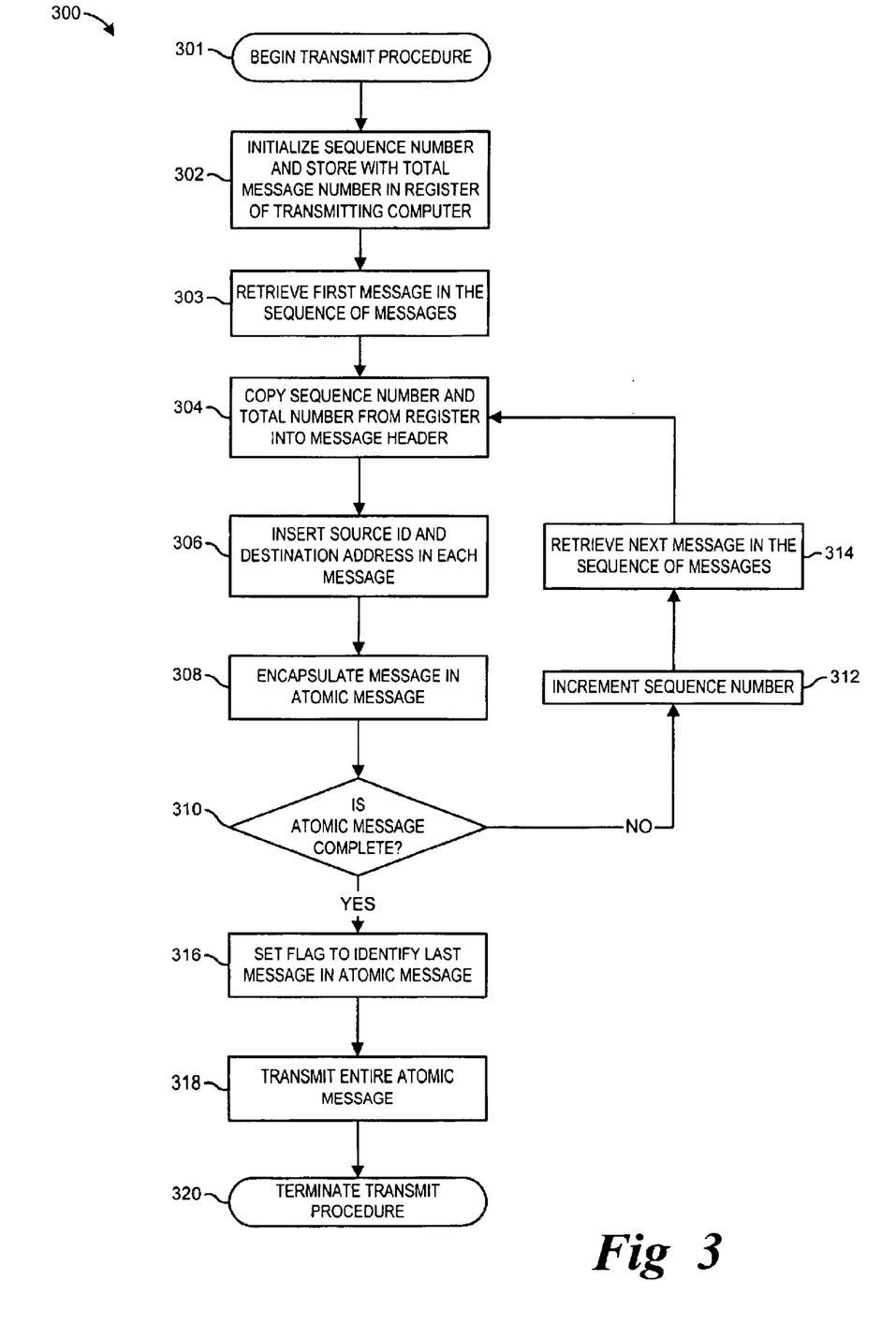
FIG. 3 is a flow chart illustrating how the atomic message of FIG. 2 may be transmitted in the system of FIG. 1.

FIG. 3 is a flowchart depicting control logic of a transmit procedure 300 implemented by appropriate protocol layers within respective processes of the system 100 for generating and transmitting the atomic message 200 (FIG. 2) in the virtual synchrony environment of the system 100 in accordance with the present invention. The steps depicted in FIG. 3 will be illustrated herein by way of an example wherein, in responding to an event, the Process A1 generates first and second messages 210 and 220 which are to be transmitted from the Process A1 to the Process Group B, a third message 230 which is to be transmitted from the Process A1 to the Process Group B and to the process group containing only the Process E. As the messages are generated, they are enqueued in the queue 114 of computer 110 until all the messages are ready to be delivered as an atomic message. A total message number representing the total number of messages is maintained in the register 112 of the computer 110. For the sake of illustration, the steps of FIGS. 3 and 4 will be exemplified using both a number representing the total number of messages encapsulated within the atomic message 200, and a last message flag which will be set only for the last message in a sequence of messages encapsulated within an atomic message, though only one such mechanism is necessary.

In step 301, the transmit procedure 300 is begun and, in step 302, a register sequence number stored in the register 112 is initialized, preferably to 1, though the sequence number may be initialized otherwise. The register sequence number is used to maintain the order of messages within the atomic message 200, as discussed below.

In step 303, the first message 210 in the sequence of messages generated by the Process A1 in response to an event, is retrieved from memory in the computer 110.

In step 304, the register sequence number and total message number are copied from the register 112 into the header 212 of the first message 210. In step 306, an identification ("ID") code identifying the transmitting, or source ("source"), computer (i.e., the computer 112 in the present example), and the destination address of the computer (i.e., the computers 110, 120, and 130) and processes to which a respective message is to be transmitted, is inserted into the header 212 of the first message 210 to be transmitted. In step 308, the first message 210 is encapsulated into the atomic message 200 and temporarily enqueued within the queue 114 of the first computer 110.

In step 310, a determination is made whether the atomic message is complete, i.e., whether all messages generated by the Process A1 in response to an event have been encapsulated into the atomic message 200. If it is determined that the atomic message is not complete, then execution proceeds to step 312; otherwise, execution proceeds to step 316. In the present example, wherein only the first message 210 has been encapsulated into the atomic message 200, execution proceeds to step 312.

In step 312, the register sequence number stored in the register 112 of the first computer 110 is incremented by predetermined quantity, preferably 1. In step 314, the next message in the sequence of messages generated in response to an event, is retrieved from memory in the computer 110. Execution then returns to step 304, and steps 304, 306, 308, 310, 312, and 314 are repeated until the atomic message 200 is complete as determined in step 310.

Upon determining in step 310 that the atomic message 200 is complete, execution proceeds to step 316 wherein a last message flag in the header 242 is set to indicate that the fourth message 240 (in the present example) is the last message in the atomic message 200.

In step 318, all destination addresses to which each of the individual messages 210, 220, 230, and 240 are to be transmitted are assembled, and the entire atomic message 200 is transmitted within the system 100 via the respective computers 110, 120, and 130 to such assembled addresses, namely, in the present example, the Process Group B (i.e., each of the Processes B1, B2, and B3), and the Processes C and E. In step 320, the transmit procedure 300 is terminated.

Figure 4:
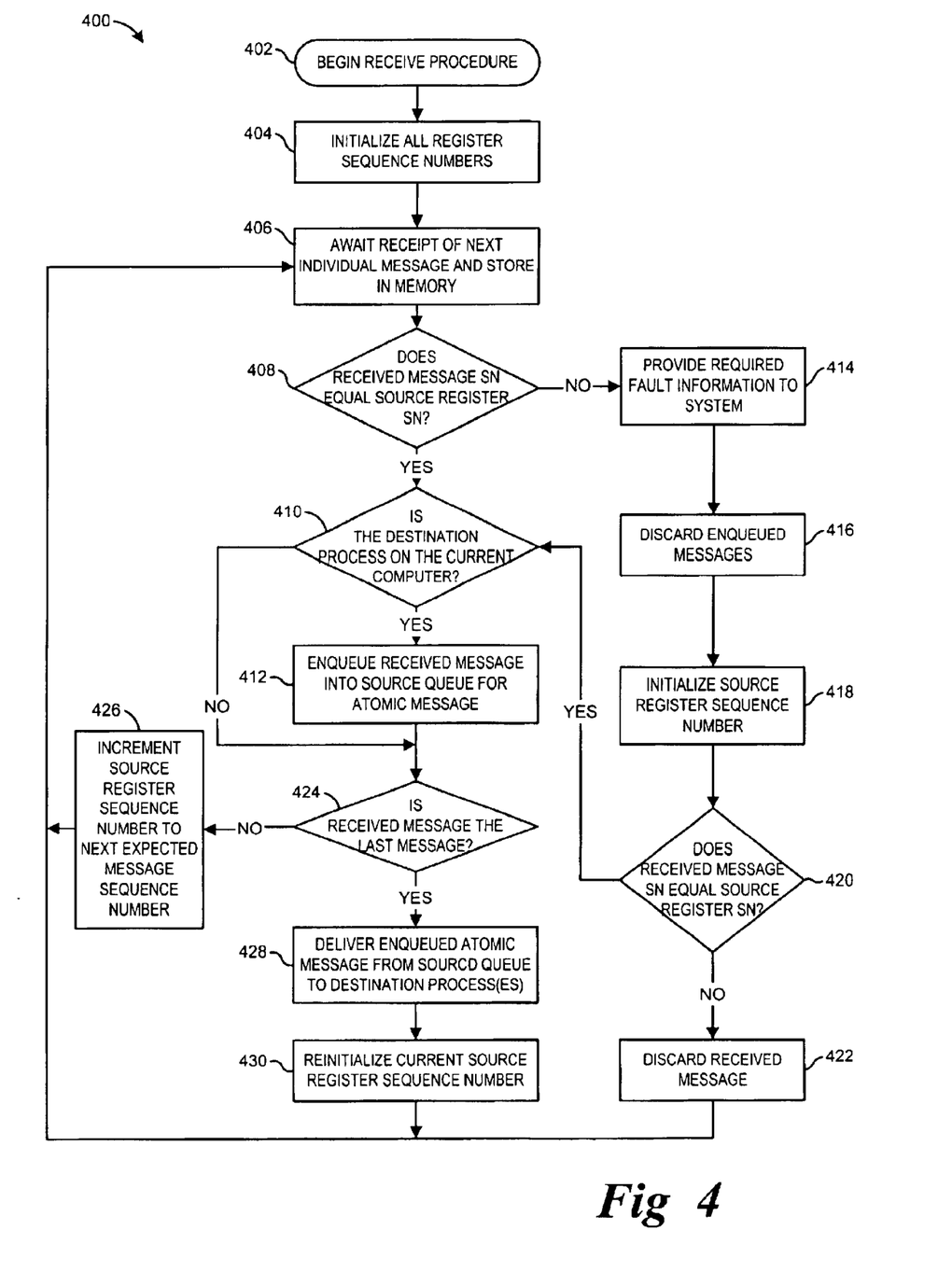
FIG. 4 is a flow chart illustrating how the atomic message of FIG. 2 may be received in the system of FIG. 1.

FIG. 4 is a flowchart depicting control logic of a receive procedure 400 implemented by appropriate protocol layers within either respective destination processes or, preferably, computers on which the respective destination processes reside, in accordance with the present invention, for receiving in a virtual synchrony environment the atomic message 200 (FIG. 2) transmitted in accordance with the steps depicted in FIG. 3 and the example used therein, as described above.

Implementation of the receive procedure 400 for receiving the atomic message 200 is virtually identical for each of the destination Processes B1, B2, B3, C, and E; therefore, for the sake conciseness, the receive procedure 400 will be described representatively herein with respect only to the Process B1. Still further, the receive procedure 400 may be implemented using protocol layers at a destination process, a computer on which a destination process resides, on a co-processor, or the like. Except for step 428, regarding the delivery of messages to individual processes as described below, the implementation of the receive procedure 400 substantially the same whether using protocol layers at a destination process, a computer, or on a co-processor.

In step 402, the receive procedure 400 begins and, in step 404, all register sequence numbers stored in a plurality of registers such as the register 112 on the computer 110 are initialized, preferably to 1, though the register sequence number may be initialized otherwise. Each register is dedicated for messages from a single source process and, will hereinafter be referred to as source registers; i.e., in the present example, the register 112 is a source register dedicated for tracking the sequence numbers of messages received from the source Process A1.

In step 406, upon receipt of the first individual message 210 of the atomic message 200, the received message is temporarily stored in the memory (not shown) of the first computer 110. In step 408, a determination is made whether the message sequence number encoded onto the received message 210 is the same as the register sequence number stored in the source register 112. If it is determined that the two sequence numbers are the same, then execution proceeds to step 410; otherwise, if the sequence numbers are not the same, then execution proceeds to step 414 to respond to the occurrence of a fault in the system 100.

In step 414, required fault information is provided to the system 100 to inform the system that at least one individual message of the atomic message 200 has been lost or corrupted.

In step 416, all messages enqueued in the queue 114 (as described below with respect to step 412) are discarded. In step 418, the source register sequence number is reinitialized.

In step 420, a determination is made whether the message sequence number encoded onto the received message 210 is the same as the register sequence number stored in the source register 112. If it is determined that the two sequence numbers are the same, then the received message is the first message of a new atomic message and execution proceeds to step 412; otherwise, if the sequence numbers are not the same, then execution proceeds to step 422 wherein the received message is discarded, and then returns to step 406.

In step 410, a determination is optionally made whether the destination process resides on the current computer (i.e., the computer 110 in the present example) executing the present procedure 400. If step 410 is optionally omitted, or if it is determined in step 410 that the destination process resides on the current computer, then execution proceeds to step 412 wherein the received message is enqueued onto the queue 112, referred to herein as a "source" queue, as it is dedicated to receiving messages from the source Process A1 to the end that the atomic message 200 be re-created. If it is determined in step 410 that the destination process does not reside on the current computer, then step 412 is omitted and execution proceeds to step 424.

In step 424, a determination is made whether the received message is last message of the atomic message 200. It may be determined that the received message is last message of the atomic message 200 if it is determined either that the message sequence number in the header 212 is the same as the total number of messages, or that the last message flag in the header 212 is set. If it is determined in step 424 that the received message is last message of the atomic message 200, then execution proceeds to step 428; otherwise, execution proceeds to step 426. In step 426, the register sequence number is incremented to the next expected message sequence number, and execution returns to step 406.

Steps 406–426 are repeated until all remaining messages in the atomic message 200 are enqueued in the queue 114 to thereby re-create in the queue the atomic message 200. Execution then proceeds to step 428 to begin delivering the individual messages to the appropriate destination processes (i.e., the process B1 in the present example). As indicated above, step 428 may be executed by protocol layers at the destination process, at the computer on which the destination process resides, on a co-processor, or the like. As discussed further below, FIG. 5 describes the execution of step 428 by protocol layers at the process, and FIG. 6 describes the execution of step 428 by protocol layers at the computer on which the destination process resides.

Upon execution of the step 428, the processes that have received the individual messages from the atomic message 200 may acting upon the individual messages in a manner well-known in the art. Execution then proceeds to step 430 wherein the current source register 112 is reinitialized, preferably to 1. Execution then returns to step 406 to await the next atomic message.

Figure 5:
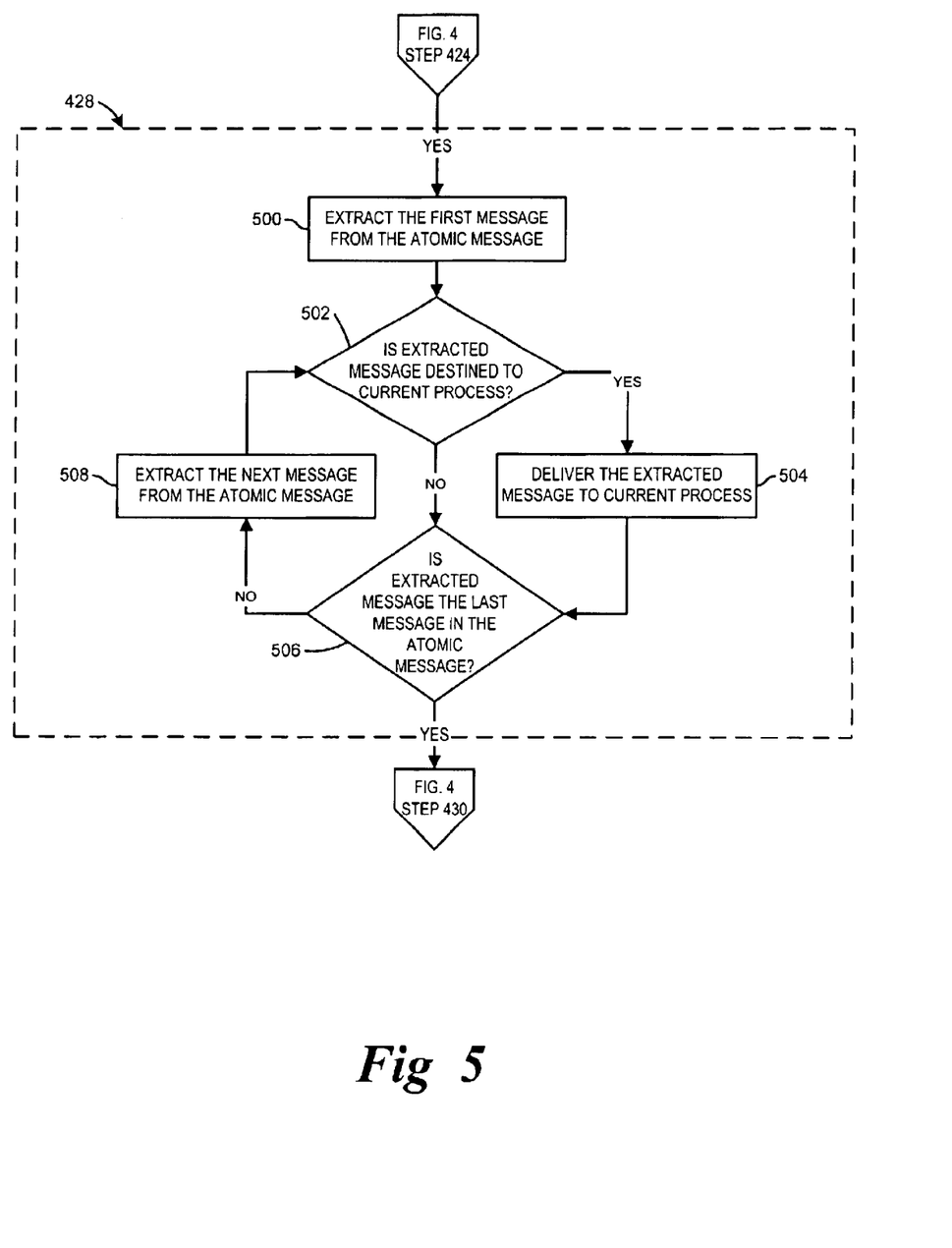
FIGS. 5 and 6 are flow charts illustrating how an atomic message in FIG. 4 may be delivered to one or more processes.

Upon completion of step 424 (FIG. 4), then in step 500 of FIG. 5, the first individual message 210 is extracted from the atomic message 200. In step 502, a determination is made whether the extracted message should be delivered to the current process (i.e., the Process B1 in the present example). If it is determined that the retrieved message should be delivered to the current process, then execution proceeds to step 504; otherwise, execution proceeds to step 506.

In step 504, the extracted message is delivered to the current process (i.e., the Process B1 in the present example). Execution then proceeds to step 506.

In step 506, a determination is made whether the extracted message is the last message in the atomic message 200. It may be determined that the received message is last message of the atomic message 200 if it is determined either that the message sequence number in the header is the same as the total number of messages, or that the last message flag in the header is set. If it is determined, in step 506, that the extracted message is the last message of the atomic message 200, then execution proceeds to step 430, described above.

If it is determined, in step 506, that the extracted message is not the last message of the atomic message 200, then execution proceeds to step 508. In step 508 the next message of the atomic message 200 is extracted from the queue 114. Execution then returns to step 502.

Steps 502–508 are repeated until all individual messages contained within the atomic message 200 are extracted and delivered to the appropriate processes. In the present example, only the individual messages 210, 220, and 230 would be delivered to the Process B1.

It can be appreciated that, upon receipt of the atomic message 200 by the Processes B2, B3, C, and E, and the further application of the steps depicted in FIGS. 4 and 5 to the Processes B2, B3, C, and E, the messages 210, 220, and 230 are delivered to the Processes B2 and B3, the message 230 is delivered to the Process C, and the message 240 is delivered to the Process E.

Figure 6:
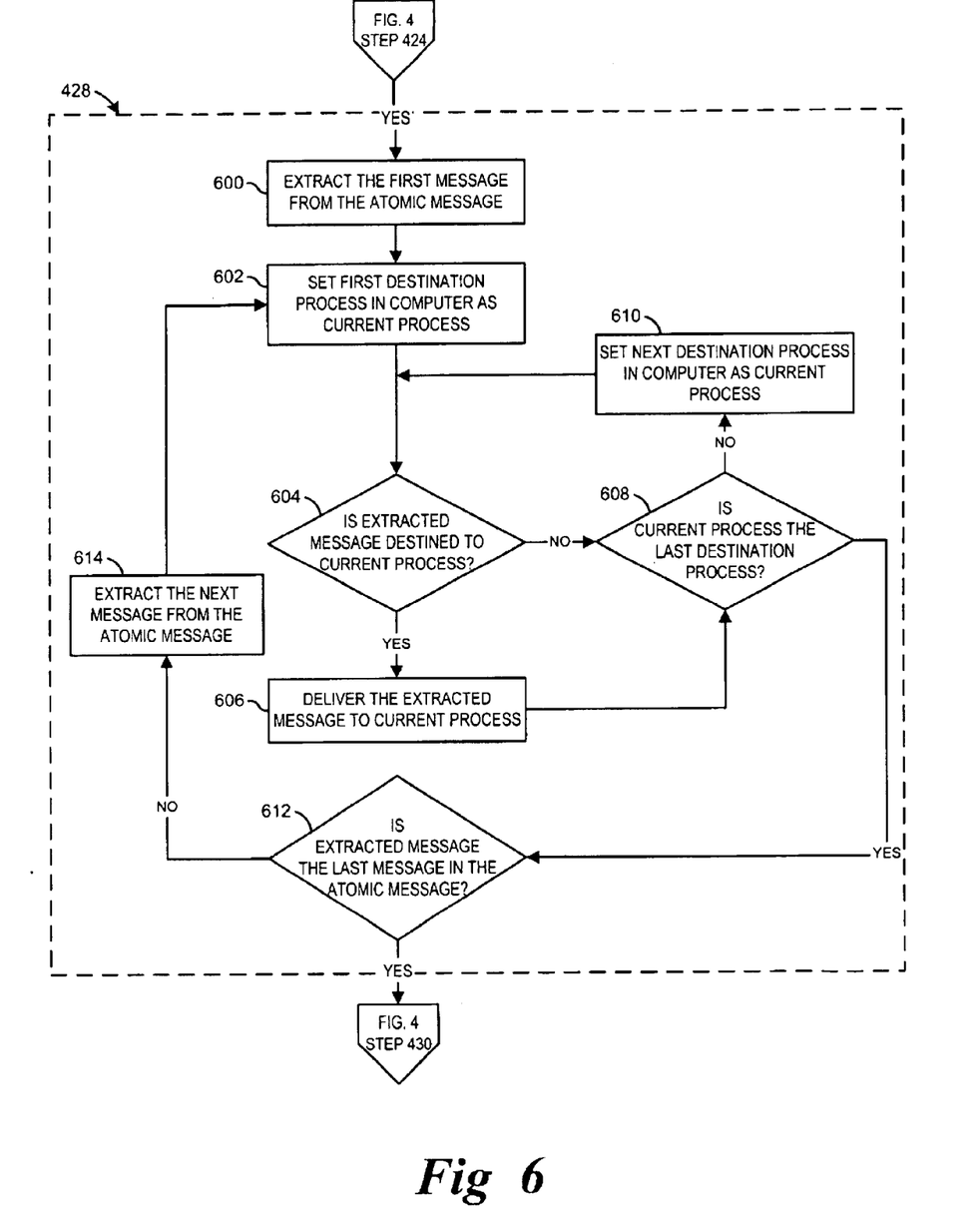

In an alternate embodiment of the present invention, if the delivery of the atomic message 200 is performed by protocol layers at the computer level rather than the process depicted in FIG. 5, then, upon completion of step 424 (FIG. 4), the steps depicted in FIG. 6 are executed, and will be exemplified with respect to the computer 112.

In step 600, the first individual message 210 is extracted from the atomic message 200. In step 602, the first destination process (i.e., the Process B1 in the present example) is set as the current process.

In step 604, a determination is made whether the extracted message 210 to be delivered to Process B1. If it is determined that the extracted message should not be delivered to Process B1, then execution proceeds to step 608; otherwise, execution proceeds to step 606, wherein the extracted message 210 is delivered to the Process B1, and then execution proceeds to step 608.

In step 608, a determination is made whether the current process is the last process in the computer 110 for which the extracted message 210 contains a destination address to which the extracted message 210 is to be delivered. If it is determined that the current process is not the last destination process, then execution proceeds to step 610, wherein the next destination process in the computer 110 is set as the current process. Upon completion of step 610, execution returns to step 604.

If it is determined in step 608 that the current process is the last destination process, as in the present example wherein the Process B1 is the only process in the computer 110 to which the extracted message 210 is destined, then execution proceeds to step 612 wherein a determination is made whether the extracted message is the last individual message in the atomic message 200. If it is determined that the extracted message is the last individual message in the atomic message 200, then execution proceeds to step 430 (FIG. 4); otherwise, execution proceeds to step 614, wherein the next individual message (i.e., the second message 220 in the present example), is extracted from the atomic message 200. Upon completion of step 614, execution returns to step 602.

Steps 602–614 are repeated in each computer 110, 120, and 130 until all individual messages 210, 220, 230, and 240 are delivered to all respective destination process, i.e., until the messages 210, 220, and 230 are delivered to the Process B1 and the message 230 is delivered to the Process C in the first computer 110, and until the messages 210, 220, and 230 are delivered to the Process B2 in the second computer 120, and until the messages 210, 220, and 230 are delivered to the Process B1 and the message 240 is delivered to the Process E in the third computer 110.

By the use of the present invention, an improved method is provided which effectively ensures that either all or none of the messages generated by a process in response to an event are delivered to their respective destination processes, thereby preventing the occurrence of faults which result from the partial delivery of messages in the system 100. As a consequence, if a failure occurs in the transmission of a message, the propagation of error is minimized. Thus, error recovery, as well as fault tolerance, is enhanced.

FIGS. 5–8 depict alternate embodiments of the atomic message 200, which embodiments are similar to the embodiment of FIG. 2, and wherein similar components are given the same reference numerals.

Figure 7:
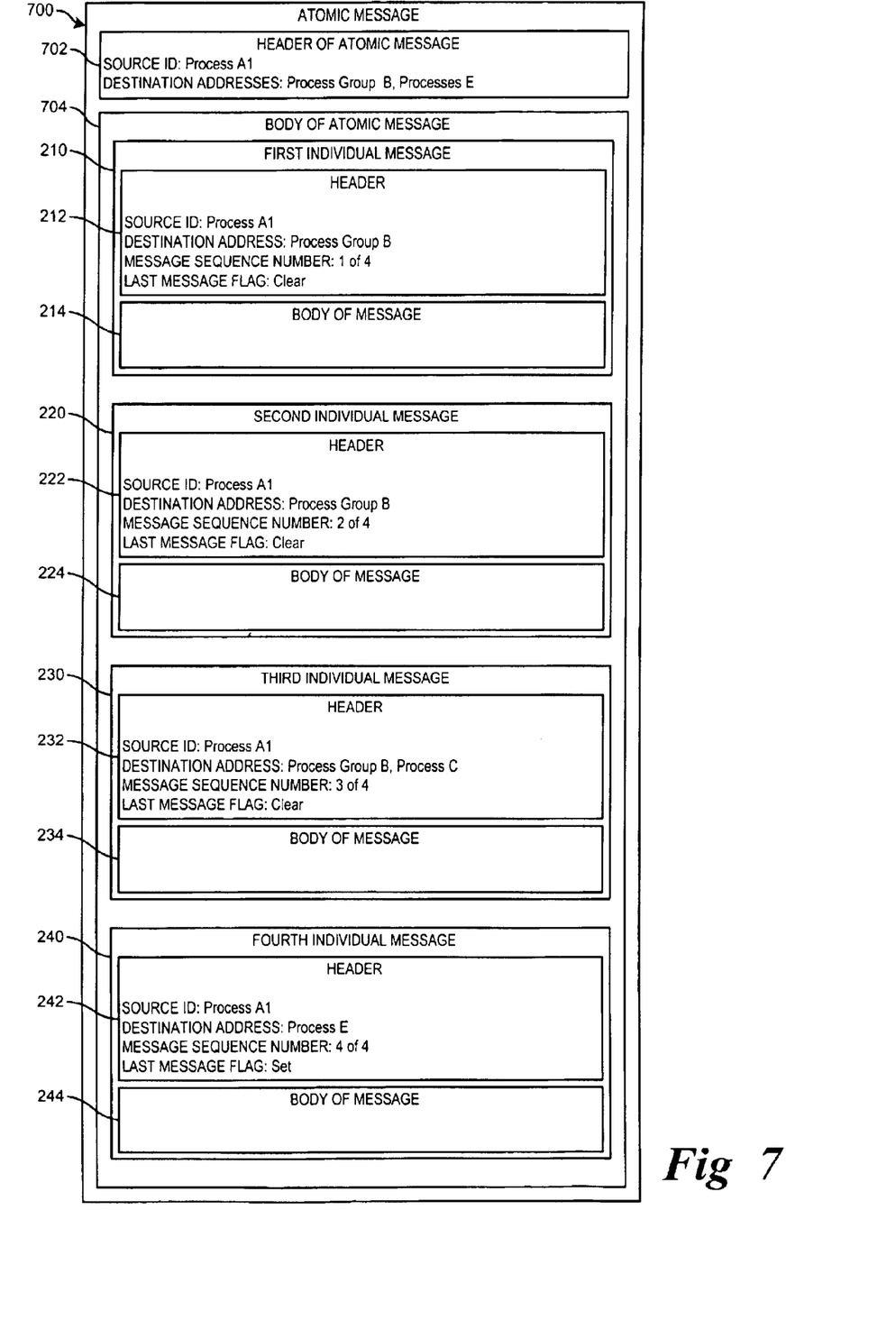
FIGS. 7–10 are schematic diagrams depicting the assembly of an atomic message according to alternate embodiments of the present invention.

According to the embodiment of FIG. 7, an atomic message 700 comprises a header 702 and a body 704. The individual messages 210, 220, 230, and 240 are encapsulated within the body 704 of the atomic message 700. Implementation of the present invention using the message 700 is similar to the implementation depicted by the procedures 300 and 400 (FIGS. 3 and 4, respectively), the only material difference being that, in the transmit procedure 300, the individual messages 210, 220, 230, and 240 must be encapsulated within the body 704 of the atomic message 700 and, in the receive procedure 400, the individual messages 210, 220, 230, and 240 must be extracted from the body 704 of the atomic message 700. In addition to the advantages discussed above, implementation of the present invention using the atomic message 700 may be more readily adapted to systems 100 which do not use atomic messages exclusively.

Figure 8:
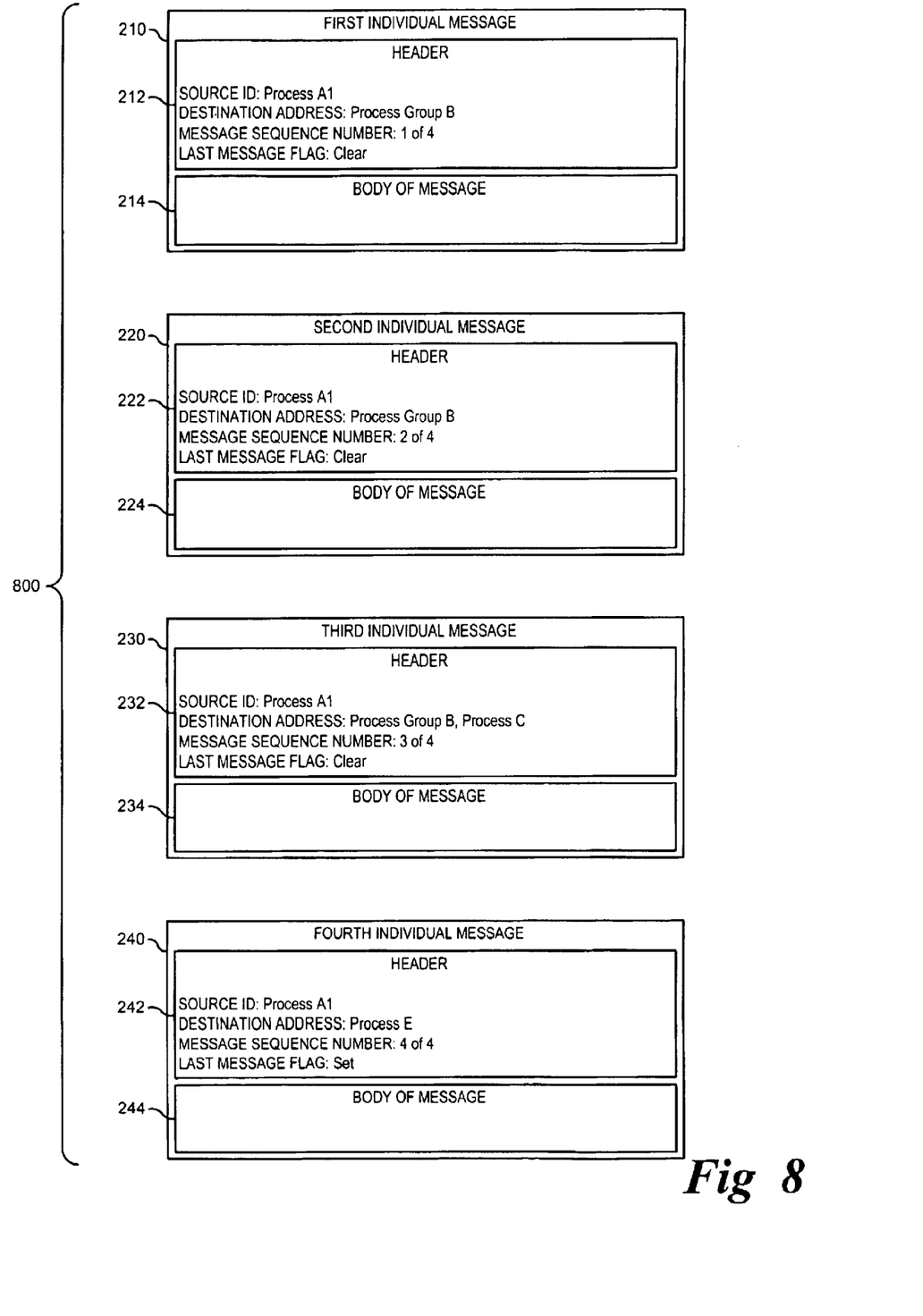

According to the embodiment of FIG. 8, an atomic message 800 comprises the individual messages 210, 220, 230, and 240 which are logically connected together based on a common Source ID stored in the respective headers 212, 222, 232, and 242. The individual messages 210, 220, 230, and 240 of the atomic message 800 may be individually transmitted through the system 100 and may be interspersed with other messages transmitted through the system 100. The individual messages of the atomic message 800 are then recombined at destination processes based on the common Source ID of each individual message. Implementation of the present invention using the message 800 is similar to the implementation depicted by the procedures 300 and 400 (FIGS. 3 and 4, respectively), the only material difference being that, in the transmit procedure 300, the individual messages 210, 220, 230, and 240 are logically connected together and, in the receive procedure 400, it is only necessary to relate the individual messages 210, 220, 230, and 240 through the common Source ID to the atomic message 800. In addition to the advantages discussed above, implementation of the present invention using the atomic message 800 depicted in FIG. 8 may be more readily implemented in systems 100 which use atomic messages exclusively.

Figure 9:
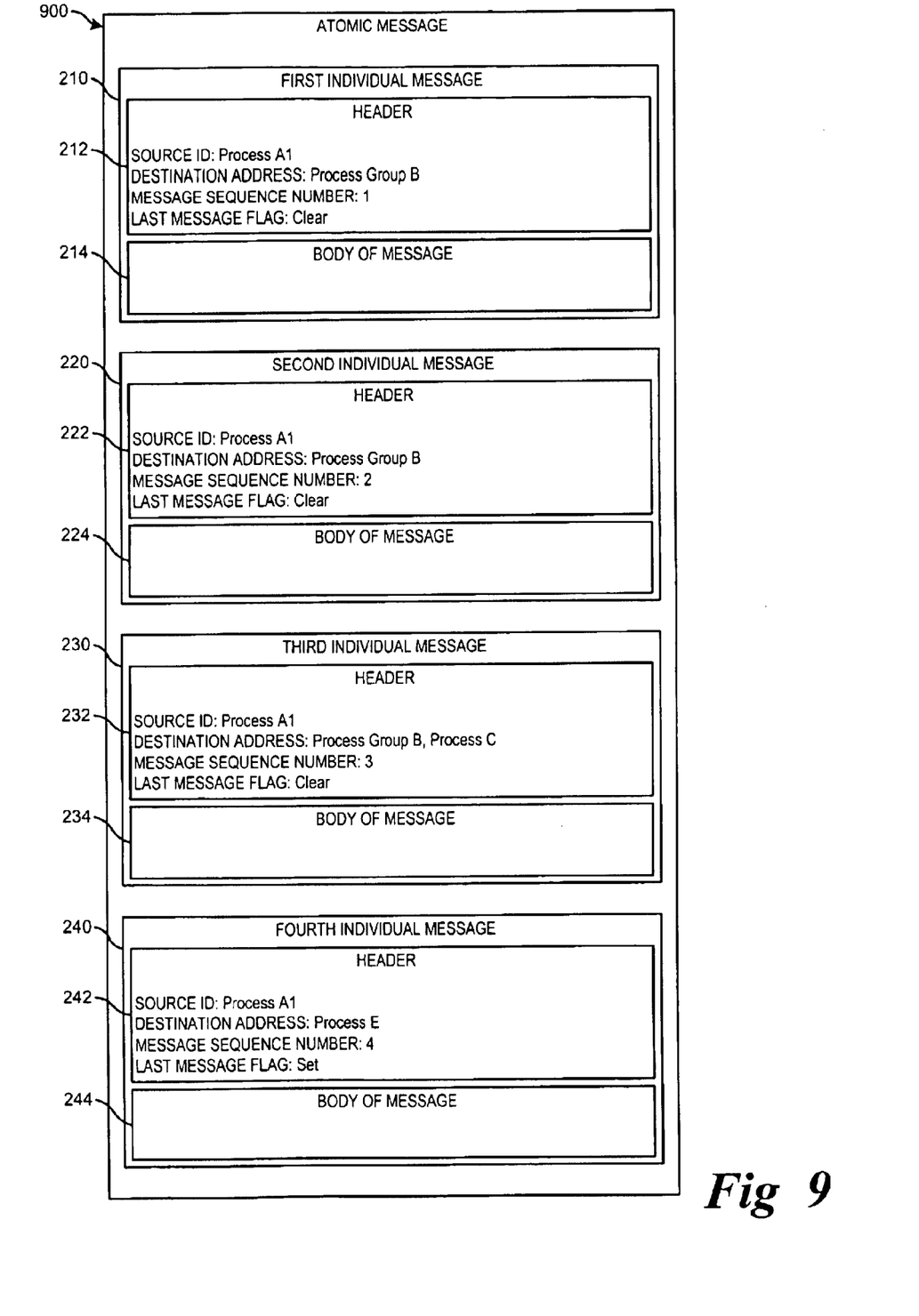
Figure 10:
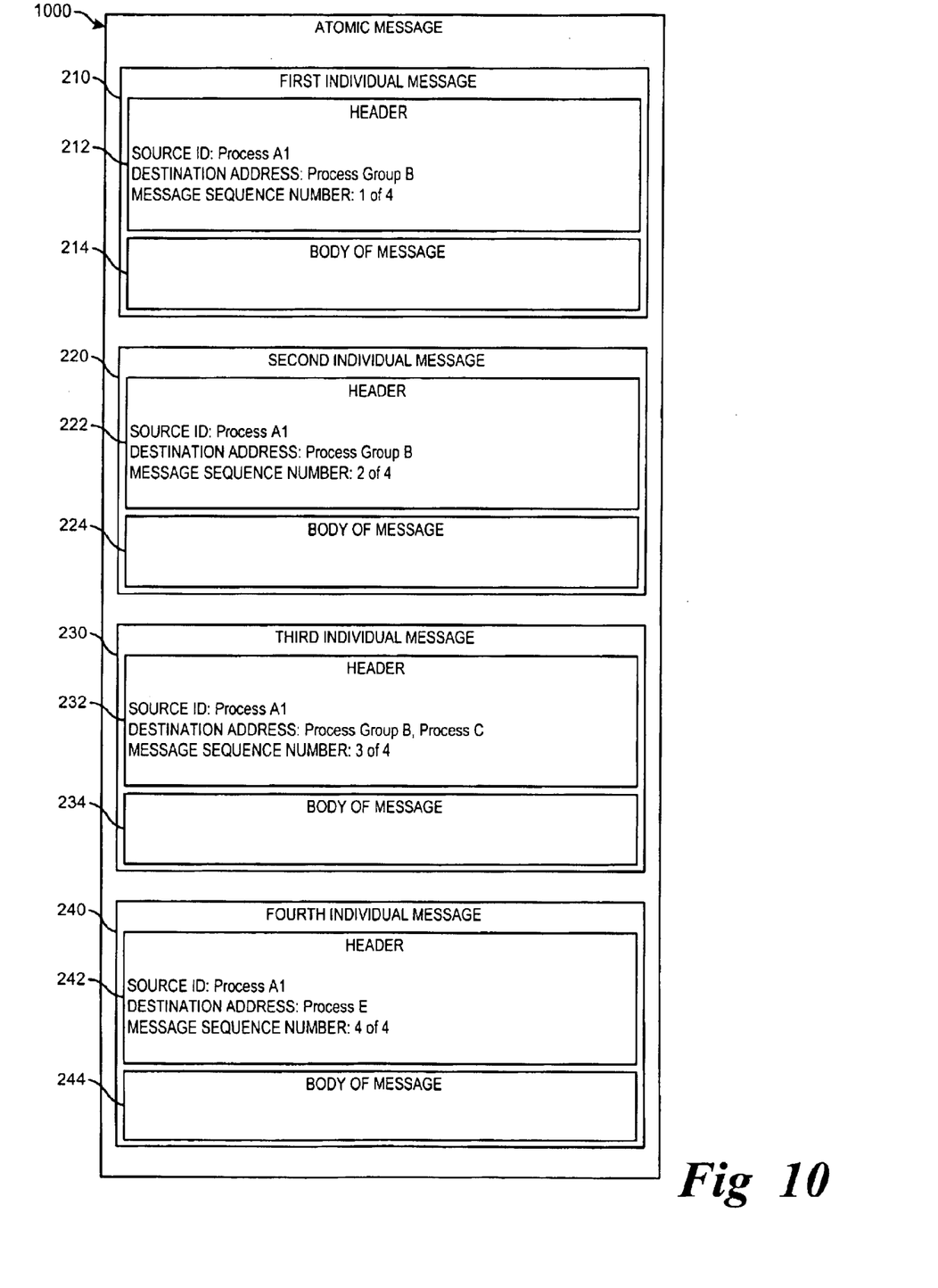

According to the embodiment of FIG. 9, an atomic message 900 is similar to the atomic message 200, but excludes the total number of messages in the header of each individual message 210, 220, 230, and 240. According to the embodiment of FIG. 10, an atomic message 1000 is similar to the atomic message 200, but excludes the last message flag in the header of each individual message 210, 220, 230, and 240. The individual messages 210, 220, 230, and 240 of the atomic messages 900 and 1000 may alternatively be encapsulated within a body of an atomic message, similar to the atomic message 700 depicted in FIG. 7, or may be unbound, similar to the atomic message 800 depicted in FIG. 8. By the use of either of the atomic messages 900 or 1000, the system 100 is limited to using only the total number of messages count or the last message flag to determine whether a message is the last message in a sequence of individual messages contained by the atomic message 200. However, in addition to the advantages described above with respect to the atomic message 200, implementation of the present invention using either the atomic message 900 or 1000 permits the present invention to be practiced more efficiently because less data in the header of each individual message must be tracked and transmitted.

It is understood that the present invention can take many forms and embodiments. Accordingly, several variations may be made in the foregoing without departing from the spirit or the scope of the invention. For example, in many systems, messages may pass through various gateways and routers, such as in a Totem system where gateways may route messages between Totem rings. If the gateways achieve a reasonable level of fault-tolerance, the atomic messages may be disassembled into individual messages once the entire atomic message has been received by the gateway. The messages may then be routed individually without compromising the atomic nature of the message.

In another example, the steps in the flow charts depicted in FIGS. 3–6 may be modified, combined with others, and/or re-arranged. For example, with reference to FIG. 4, the step 428 may be integrated into the step 412, so that, under certain circumstances, messages may be delivered to their respective processes when they are enqueued.

In yet another example, atomic message fault recovery may be provided by designating one process as a backup process for a primary process effective for generating an atomic message. Such a backup process may be configured to detect fault in an atomic message by monitoring selected atomic messages for completeness, and by monitoring the system for error messages from destination processes indicating that an atomic message is incomplete. Upon detecting a fault associated with an atomic message transmitted by the primary process, the backup process may be configured to take suitable actions to recover from the fault.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for transmitting, through a system in a virtual synchrony environment, at least one individual message generated by a first process in response to an event or incoming message, comprising, for each individual message, the steps of:
   a) retrieving the individual message from the first process;
   b) storing in a header of the individual message an identification of the first process as the source of the individual message;
   c) storing in the header of the individual message a destination address of at least one second process and/or process group to which the individual message is to be transmitted;
   d) tracking and storing in the header of the individual message a sequence number indicating the sequence of the individual message in the at least one individual message;
   e) enqueueing the individual message in a queue to form an atomic message comprising individual messages to be transmitted from the first process to the at least one second process and/or process group;
   f) determining whether the individual message is a last individual message of the at least one individual message; and
   g) upon a determination that the individual message is the last individual message of the at least one individual message:
      storing in a header of the individual message an indication that the individual message is the last individual message of the at least one message;
      retrieving the individual messages enqueued in the queue;
      assembling the retrieved individual messages to form an atomic message; and
      releasing the atomic message to the system for transmission through the virtual synchrony environment to the destination address of each of the at least one second processes and/or process groups to which each of the individual messages are to be transmitted.

2. The method of claim 1 wherein the step of tracking further comprises:
   a) initializing a register with a register sequence number prior to retrieving the first individual message of the at least one individual message; and for each individual message in sequence:
   b) storing the register sequence number in the header of the individual message; and
   c) incrementing the register sequence number.

3. The method of claim 1 wherein the step of storing in a header of the individual message an indication that the individual message is the last individual message of the at least one individual message further comprises setting a last individual message flag stored in the header of the individual message, which flag is clear for all other individual messages.

4. The method of claim 1 wherein the step of storing in a header of the individual message an indication that the individual message is the last individual message of the at least one individual message further comprises storing in the header of the individual message the total number of individual messages in the at least one individual message.

5. The method of claim 1 wherein the steps are performed by protocol layers of the first process.

6. The method of claim 1 wherein the steps are performed by protocol layers of the computer, external to the first process.

7. The method of claim 1 wherein the steps are performed by a co-processor.

8. The method of claim 1 wherein the step of assembling further comprises inserting the individual messages within a body of an atomic message.

9. The method of claim 1 wherein the step of assembling further comprises logically relating the individual messages together which contain the same source identification.

10. The method of claim 1 wherein the step of releasing further comprises assembling, into a header for transmission of the atomic message, the destination addresses of each of the at least one second processes and/or process groups to which each of the individual messages are to be transmitted.

11. A method for receiving, through a system in a virtual synchrony environment, an atomic message having at least one individual message generated and transmitted by a first process in a computer to a destination address identified in at least one second process in at least one computer, comprising, for each individual message, the steps of:
   a) receiving the individual message into a portion of a memory;
   b) extracting a sequence number, which becomes an identified sequence number, stored within a header of the individual message;
   c) determining whether the identified sequence number is an expected sequence number further comprising the initialization of memory;

d) upon a determination that the identified sequence number is an expected sequence number, enqueueing the received individual message into a queue, creating an enqueued individual message;

e) determining whether the individual message is a last individual message; and f) upon a determination that the individual message is a last individual message, delivering the enqueued individual messages as an atomic message to the at least one destination process.

12. The method of claim 11 wherein the step of determining whether the identified sequence number is an expected message sequence number further comprises initializing a register with a register sequence number prior to receiving the first individual message of the atomic message; and for each individual message in sequence:

a) determining whether the register sequence number is equal to a message sequence number stored in the header of the individual message;

b) upon a determination that the register sequence number is equal to the message sequence number stored in the header of the individual message, incrementing the register sequence number; and c) upon a determination that the register sequence number is not equal to the message sequence number stored in the header of the individual message, providing fault information to the system, and discarding all individual messages received from the first process.

13. The method of claim 11 wherein the step of determining whether the identified sequence number is an expected message sequence number further comprises initializing a register with a register sequence number prior to receiving the first individual message of the atomic message; and for each individual message in sequence:

a) determining whether the register sequence number is equal to a message sequence number stored in the header of the individual message;

b) upon a determination that the register sequence number is equal to the message sequence number stored in the header of the individual message, incrementing the register sequence number; and c) upon a determination that the register sequence number is not equal to the message sequence number stored in the header of the individual message, providing fault information to the system, discarding all individual messages received from the first process, and repeating the step of initializing.

14. The method of claim 11 wherein the step of determining whether the identified sequence number is an expected message sequence number further comprises initializing a register with a register sequence number prior to receiving the first individual message of the atomic message; and for each individual message in sequence:

a) determining whether the register sequence number is equal to a message sequence number stored in the header of the individual message;

b) upon a determination that the register sequence number is equal to the message sequence number stored in the header of the individual message, incrementing the register sequence number; and c) upon a determination that the register sequence number is not equal to the message sequence number stored in the header of the individual message, providing fault information to the system, discarding all enqueued individual messages received from the first process, repeating the step of initializing, and determining whether the message sequence number of the received individual message is equal to the register sequence number;

d) upon a determination that the message sequence number of the received individual message is equal to the register sequence number, repeating the steps of enqueueing the received individual message in a queue, and determining whether the received individual message is the last individual message.

15. The method of claim 11 wherein the step of determining whether the individual message is a last individual message further comprises determining whether the message sequence number is equal to the total number of individual messages in the atomic message.

16. The method of claim 11 wherein the step of determining whether the individual message is a last individual message further comprises determining whether the individual message contains a set last message flag.

17. The method of claim 11 wherein the step of delivering further comprises:

a) retrieving the first individual message from the atomic message;

b) determining whether the retrieved individual message contains a destination address to a selected second process;

c) upon a determination that the retrieved individual message contains a destination address to a selected second process, delivering the retrieved individual message to the selected process;

d) determining whether the retrieved individual message is the last individual message in the atomic message;

e) upon a determination that the retrieved individual message is the last individual message in the atomic message, reinitializing the register sequence number, and returning to the step of determining whether the sequence number of a next received individual message is equal to the register sequence number; and f) upon a determination that the retrieved individual message is not the last individual message in the atomic message, retrieving the next individual message from the atomic message, and returning to the step of determining whether the retrieved individual message contains a destination address to the selected second process.

18. The method of claim 11 wherein the step of delivering further comprises:

a) retrieving the first individual message from the atomic message;

b) setting the first process as a current process;

c) determining whether the retrieved individual message contains a destination address to the current process;

d) upon a determination that the retrieved individual message contains a destination address to the current process, delivering the retrieved individual message to the current process, and determining whether the current process is the last process;

e) upon a determination that the retrieved individual message does not contain a destination address to the current process, determining whether the current process is the last process;

f) upon a determination that the current process is not the last process, setting a next process as the current process, and returning to the step of determining whether the retrieved individual message contains a destination address to the current process;

g) upon a determination that the current process is not the last process, determining whether the retrieved individual message is the last individual message in the atomic message;

h) upon a determination that the retrieved individual message is not the last individual message in the atomic message, retrieving a next individual message from the atomic message; and i) upon a determination that the retrieved individual message is the last individual message in the atomic message, returning to the step of determining whether the retrieved individual message contains a destination address to the selected second process.

19. The method of claim 11 wherein the steps are performed by protocol layers of the first process.

20. The method of claim 11 wherein the steps are performed by protocol layers of the computer, external to the first process.

21. The method of claim 11 wherein the steps are performed by a co-processor.

22. A method for transmitting, through a system in a virtual synchrony environment, at least one individual message generated by a first process in response to an event or incoming message, and for receiving the at least one individual message at a destination address identified in at least one second process in at least one computer, the method comprising, for each individual message, the steps of:

a) retrieving the individual message from the first process;

b) storing in a header of the individual message an identification of the first process as the source of the individual message;

c) storing in the header of the individual message a destination address of at least a second process and/or process group to which the individual message is to be transmitted;

d) tracking and storing in the header of the individual message a sequence number indicating the sequence of the individual message in the at least one individual message;

e) enqueueing the individual message into a queue to form an atomic message comprising individual messages to be transmitted from the first process to the at least one second process and/or process group;

f) determining whether the individual message is a last individual message of the at least one individual message;

g) upon a determination that the individual message is the last individual message of the at least one individual message, storing in a header of the individual message an indication that the individual message is the last individual message of the at least one individual message, retrieving the individual messages enqueued in the queue, assembling the retrieved individual messages to form an atomic message, and releasing the atomic message to the system for transmission through the virtual synchrony environment to the destination address of each of the at least one second processes and/or process groups to which each of the individual messages are to be transmitted;

h) receiving the individual message in a destination computer;

i) extracting a sequence number stored within a header of the individual message;

j) determining whether the identified sequence number is an expected sequence number;

k) upon a determination that the identified sequence number is an expected sequence number, enqueueing the received individual message into a queue;

l) determining whether the individual message is a last individual message; and m) upon a determination that the individual message is a last individual message, delivering the enqueued individual messages as an atomic message to the at least one destination process.

23. The method of claim 22 wherein the step of tracking further comprises:

a) initializing a register with a register sequence number prior to retrieving the first individual message of the at least one individual message; and for each individual message in sequence:

b) storing the register sequence number in the header of the individual message; and c) incrementing the register sequence number.

24. The method of claim 22 wherein the step of storing in a header of the individual message an indication that the individual message is the last individual message of the at least one individual message further comprises setting a last individual message flag stored in the header of the individual message, which flag is clear for all other individual messages.

25. The method of claim 22 wherein the step of storing in a header of the individual message an indication that the individual message is the last individual message of the at least one individual message further comprises storing in the header of the individual message the total number of individual messages in the at least one individual message.

26. The method of claim 22 wherein the step of assembling further comprises inserting the individual messages within a body of an atomic message.

27. The method of claim 22 wherein the step of assembling further comprises logically relating the individual messages together which contain the same source identification.

28. The method of claim 22 wherein the step of determining whether the identified sequence number is an expected message sequence number further comprises initializing a register with a register sequence number prior to receiving the first individual message of the atomic message; and for each individual message in sequence:

a) determining whether the register sequence number is equal to a message sequence number stored in the header of the individual message;

b) upon a determination that the register sequence number is equal to the message sequence number stored in the header of the individual message, incrementing the register sequence number; and c) upon a determination that the register sequence number is not equal to the message sequence number stored in the header of the individual message, providing fault information to the system, and discarding all individual messages received from the first process.

29. The method of claim 22 wherein the step of determining whether the identified sequence number is an expected message sequence number further comprises initializing a register with a register sequence number prior to receiving the first individual message of the atomic message; and for each individual message in sequence:

a) determining whether the register sequence number is equal to a message sequence number stored in the header of the individual message;

b) upon a determination that the register sequence number is equal to the message sequence number stored in the header of the individual message, incrementing the register sequence number; and c) upon a determination that the register sequence number is not equal to the message sequence number stored in the header of the individual message, providing fault information to the system, discarding all individual messages received from the first process, and repeating the step of initializing.

30. The method of claim 22 wherein the step of determining whether the identified sequence number is an expected message sequence number further comprises initializing a register with a register sequence number prior to receiving the first individual message of the atomic message; and for each individual message in sequence:

a) determining whether the register sequence number is equal to a message sequence number stored in the header of the individual message;

b) upon a determination that the register sequence number is equal to the message sequence number stored in the header of the individual message, incrementing the register sequence number; and c) upon a determination that the register sequence number is not equal to the message sequence number stored in the header of the individual message, providing fault information to the system, discarding all enqueued individual messages received from the first process, repeating the step of initializing, and determining whether the message sequence number of the received individual message is equal to the register sequence number;

d) upon a determination that the message sequence number of the received individual message is equal to the register sequence number, repeating the steps of enqueueing the received individual message in a queue, and determining whether the received individual message is the last individual message.

31. The method of claim 22 wherein the step of determining whether the individual message is a last individual message further comprises determining whether the message sequence number is equal to the total number of individual messages in the atomic message.

32. The method of claim 22 wherein the step of determining whether the individual message is a last individual message further comprises determining whether the individual message contains a set last message flag.

33. The method of claim 22 wherein the step of delivering further comprises:

a) retrieving the first individual message from the atomic message;

b) determining whether the retrieved individual message contains a destination address to a selected second process;

c) upon a determination that the retrieved individual message contains a destination address to a selected second process, delivering the retrieved individual message to the selected process;

d) determining whether the retrieved individual message is the last individual message in the atomic message;

e) upon a determination that the retrieved individual message is the last individual message in the atomic message, reinitializing the register sequence number, and returning to the step of determining whether the sequence number of a next received individual message is equal to the register sequence number; and f) upon a determination that the retrieved individual message is not the last individual message in the atomic message, retrieving the next individual message from the atomic message, and returning to the step of determining whether the retrieved individual message contains a destination address to the selected second process.

34. The method of claim 22 wherein the step of delivering further comprises:

a) retrieving the first individual message from the atomic message;

b) setting the first process as a current process;

c) determining whether the retrieved individual message contains a destination address to the current process;

d) upon a determination that the retrieved individual message contains a destination address to the current process, delivering the retrieved individual message to the current process, and determining whether the current process is the last process;

e) upon a determination that the retrieved individual message does not contain a destination address to the current process, determining whether the current process is the last process;

f) upon a determination that the current process is not the last process, setting a next process as the current process, and returning to the step of determining whether the retrieved individual message contains a destination address to the current process;

g) upon a determination that the current process is not the last process, determining whether the retrieved individual message is the last individual message in the atomic message;

h) upon a determination that the retrieved individual message is not the last individual message in the atomic message, retrieving a next individual message from the atomic message; and i) upon a determination that the retrieved individual message is the last individual message in the atomic message, returning to the step of determining whether the retrieved individual message contains a destination address to the selected second process.

35. The method of claim 22 wherein the steps are performed by protocol layers of the first process.

36. The method of claim 22 wherein the steps are performed by protocol layers of the computer, external to the first process.

37. The method of claim 22 wherein the steps are performed by a co-processor.

38. The method of claim 22 wherein the step of releasing further comprises assembling, into a header for transmission of the atomic message, the destination addresses of each of the at least one second processes and/or process groups to which each of the individual messages are to be transmitted.

39. A computer program product for transmitting, through a system in a virtual synchrony environment, at least one individual message generated by a first process in response to an event or incoming message, the computer program product having a medium with a computer program embodied thereon, the computer program comprising, for each individual message:

a) computer program code for retrieving the individual message from the first process;

b) computer program code for storing in a header of the individual message an identification of the first process as the source of the individual message;

c) computer program code for storing in the header of the individual message a destination address of at least one second process and/or process group to which the individual message is to be transmitted;

d) computer program code for tracking and storing in the header of the individual message a sequence number indicating the sequence of the individual message in the at least one individual message;

e) computer program code for enqueueing the individual message in a queue to form an atomic message comprising individual messages to be transmitted from the first process to the at least one second process and/or process group; and f) computer program code for determining whether the individual message is a last individual message of the at least one individual message and, upon a determination that the individual message is the last individual message of the at least one individual message, for:

storing in a header of the individual message an indication that the individual message is the last individual message of the at least one message;

retrieving the individual messages enqueued in the queue;

assembling the retrieved individual messages to form an atomic message; and releasing the atomic message to the system for transmission through the virtual synchrony environment to the destination address of each of the at least one second processes and/or process groups to which each of the individual messages are to be transmitted.

40. A computer program product for receiving, through a system in a virtual synchrony environment, an atomic message having at least one individual message generated and transmitted by a first process in a computer to a destination address identified in at least one second process in at least one computer, the computer program product having a medium with a computer program embodied thereon, the computer program comprising, for each individual message:

a) computer program code for receiving the individual message into a portion of a memory;

b) computer program code for extracting a sequence number, which becomes an identified sequence number, stored within a header of the individual message;

c) computer program code for determining whether the identified sequence number is an expected sequence number, which also initializes a memory, and, upon a determination that the identified sequence number is an expected sequence number, for enqueueing the received individual message into a queue, creating an enqueued individual message; and d) computer program code for determining whether the individual message is a last individual message and, upon a determination that the individual message is a last individual message, for delivering the enqueued individual messages as an atomic message to the at least one destination process.

* * * * *